(12) United States Patent
Chow et al.

(10) Patent No.: US 12,205,374 B2
(45) Date of Patent: Jan. 21, 2025

(54) DAMAGE DETECTION FOR VEHICLES ON A TRANSPORTER

(71) Applicant: Capital One Services, LLC, McLean, VA (US)

(72) Inventors: Chih-Hsiang Chow, Plano, TX (US); Elizabeth Furlan, Plano, TX (US); Steven Dang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 431 days.

(21) Appl. No.: 17/471,329

(22) Filed: Sep. 10, 2021

(65) Prior Publication Data

US 2023/0084083 A1 Mar. 16, 2023

(51) Int. Cl.
| | |
|---|---|
| *G06V 20/52* | (2022.01) |
| *G06F 18/22* | (2023.01) |
| *G06V 10/147* | (2022.01) |
| *H04N 23/90* | (2023.01) |

(52) U.S. Cl.
CPC ............ *G06V 20/52* (2022.01); *G06F 18/22* (2023.01); *G06V 10/147* (2022.01); *H04N 23/90* (2023.01)

(58) Field of Classification Search
CPC ...... G06V 20/52; G06V 10/147; G06V 20/56; G06F 18/22; H04N 23/90
See application file for complete search history.

(56) References Cited

U.S. PATENT DOCUMENTS 10,686,976 B2 * 6/2020 Nalepka ................. G06V 20/56
10,814,800 B1 10/2020 Gould
10,838,425 B2 11/2020 Wendel et al.
2018/0165541 A1 * 6/2018 Amico ................. G06T 7/0004
2019/0043273 A1 * 2/2019 Cordova ............... G07C 5/0841
(Continued)

FOREIGN PATENT DOCUMENTS

WO 2017065352 A1 4/2017
WO WO-2020234089 A1 * 11/2020 ......... G06K 9/00664

OTHER PUBLICATIONS

Besl, P. J., & Jain, R. C. (1985). Three-dimensional object recognition. ACM Computing Surveys (CSUR), 17(1), 75-145. (Year: 1985).*

(Continued)

*Primary Examiner* — Bobbak Safaipour
*Assistant Examiner* — Ashley L. Hytrek
(74) *Attorney, Agent, or Firm* — Sterne, Kessler, Goldstein & Fox P.L.L.C.

(57) ABSTRACT

Disclosed herein are system, method, and computer program product embodiments for detecting a potential damage caused to a vehicle when the vehicle is placed on a transporter. The method includes obtaining a first image and a second image taken at different time instances. The first image and the second image are generated by one or more cameras placed around a vehicle on a transporter, and cover a same portion of a body of the vehicle. The method further includes detecting a change between a portion of the first image corresponding to the portion of the body of the vehicle and a portion of the second image corresponding to the portion of the body of the vehicle indicative of a collision. Moreover, the method includes flagging a potential damage to the portion of the body of the vehicle based on the detected change between the first image and the second image.

20 Claims, 6 Drawing Sheets

(56) References Cited

U.S. PATENT DOCUMENTS

| | | |
|---|---|---|
| 2019/0046373 A1 | 2/2019 | Coulter et al. |
| 2019/0108396 A1* | 4/2019 | Dal Mutto ............. G06V 20/52 |
| 2020/0137360 A1* | 4/2020 | Somers ................ G08B 21/182 |
| 2020/0234488 A1* | 7/2020 | Holzer ................... G06F 3/011 |
| 2020/0236296 A1* | 7/2020 | Holzer ................... G06T 19/20 |
| 2020/0240874 A1* | 7/2020 | Utting ....................... B60S 3/04 |
| 2020/0364802 A1* | 11/2020 | Zhou .................... G06V 10/809 |
| 2020/0410278 A1* | 12/2020 | Nelson ................... G06F 18/22 |

OTHER PUBLICATIONS

Andrade-Cetto, J., & Villamizar Vergel, M. A. (2007). Object recognition. (Year: 2007).*

* cited by examiner

DAMAGE DETECTION FOR VEHICLES ON A TRANSPORTER

BACKGROUND

Vehicles play an essential role in daily lives. Vehicles are manufactured by manufacturers, shipped or transported to the dealership, and sold to customers. In addition, vehicles may be shipped or transported by owners or drivers from one location to another due to a move for a job or family. Sometimes, vehicles may be shipped or transported thousands of miles over a long time, such as days or weeks. During the long time and route of shipping, vehicles may be damaged by various causes. It is important to detect such damages.

BRIEF SUMMARY

Disclosed herein are system, apparatus, device, method and/or computer program product embodiments, and/or combinations and sub-combinations thereof for detecting potential damage caused to a vehicle when the vehicle is placed on a transporter to be shipped or transported from one location to another. When a vehicle is being shipped or transported on a transporter, the vehicle is not in a driving mode or operational state, and may not have power to operate the equipment such as built-in cameras within the vehicle. Solutions are needed to detect potential damage caused to the vehicle when the vehicle is being shipped or transported.

In some examples, a computer-implemented method is presented for detecting potential damage caused to a vehicle when the vehicle is placed on a transporter to be shipped or transported from one location to another. The method includes obtaining a first image taken at a first time instance, and a second image taken at a second time instance after the first time instance. The first image and the second image are generated by one or more cameras placed around a vehicle on a transporter, and the first image and the second image cover a same portion of a body of the vehicle. The method further includes detecting a change between a portion of the first image corresponding to the portion of the body of the vehicle and a portion of the second image corresponding to the portion of the body of the vehicle indicative of a collision. Moreover, the method includes flagging potential damage to the portion of the body of the vehicle based on the detected change between the first image and the second image.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Vehicles can be transported from one location to another for various reasons. For example, a vehicle can be transported from the factory where it is manufactured by the manufacturer to the dealership to be sold to customers. In addition, vehicles may be shipped or transported by owners or drivers from one location to another due to the owners moving for job or family. During shipment, vehicles may be damaged by various causes. It is important to detect such damages occurring on the vehicle during the shipment.

When a vehicle is being transported on a transporter, the vehicle can be in a non-operative state, without a driver or passenger inside the vehicle. For example, the engine of the vehicle may not be in operation, and any built-in cameras included in the vehicle when the vehicle is manufactured may not be in operation. Solutions are needed to monitor the vehicle placed on a transporter for potential damage without using any built-in cameras or other monitoring functions of the vehicle.

Disclosed herein are system, apparatus, device, method and/or computer program product embodiments, and/or combinations and sub-combinations thereof for detecting potential damage caused to a vehicle when the vehicle is placed on a transporter to be shipped or transported from one location to another. A plurality of cameras, which may not be the built-in cameras of the vehicle, can be placed on the transporter or on the vehicle to provide coverage around the vehicle. Such cameras can be placed around the vehicle before the shipment starts, and can be removed after the vehicle has arrived at the destination. In some embodiments, the cameras used in monitoring the vehicle on the transporter can be different from cameras used in a computer assisted or autonomous driving (CA/AD) vehicle. For a CA/AD vehicle, driving decisions can be made based on the images captured by the built-in cameras of the CA/AD vehicle, which can impact the safety of the vehicle and the driver during driving. Therefore, cameras on a CA/AD vehicle may have high precision, high resolution, and high speed, and the generated images are processed onboard the vehicle to make driving decisions instantly. On the other hand, since the vehicle being transported is not in an operational state without the need to make immediate driving decisions, cameras used to monitor the vehicle in transit can be low precision, low resolution, and/or low speed compared to the built-in cameras in a CA/AD vehicle.

A sequence of images including a first image and a second image can be generated by the cameras installed to monitor the vehicle in transit. Since the vehicle is not in an operational state, the images generated can be transmitted to a computing device for further processing, where the computing device can be off site and separate from the vehicle. In some embodiments, the first image and the second image are received by the computing device from the cameras at least partially by wireless communication. The computing device can detect a change between a portion of the first image corresponding to the portion of the body of the vehicle and a portion of the second image corresponding to the portion of the body of the vehicle indicative of a damage (e.g., collision). Hence, the first image and the second image may be different from images captured by built-in cameras of a CA/AD vehicle. For a camera in a CA/AD vehicle, the camera is more likely used to capture other objects around the vehicle, instead of the body of the vehicle. Once a change is detected, the computing device can flag potential damage to the portion of the body of the vehicle based on the detected change between the first image and the second image.

While the images may be generated by cameras continuously throughout the shipment route, the computing device may process the images in real time or at different times. For example, the images can be processed daily, or after the vehicle is delivered. If the vehicle arrives at the destination without any damage, there may not be any need to process the images received by the computing device. On the other hand, if there is a claim on damages to the vehicle during the shipment, the computing device can process the images received and identify the date, time, and/or location of when the damage occurred.

Figure 1A:
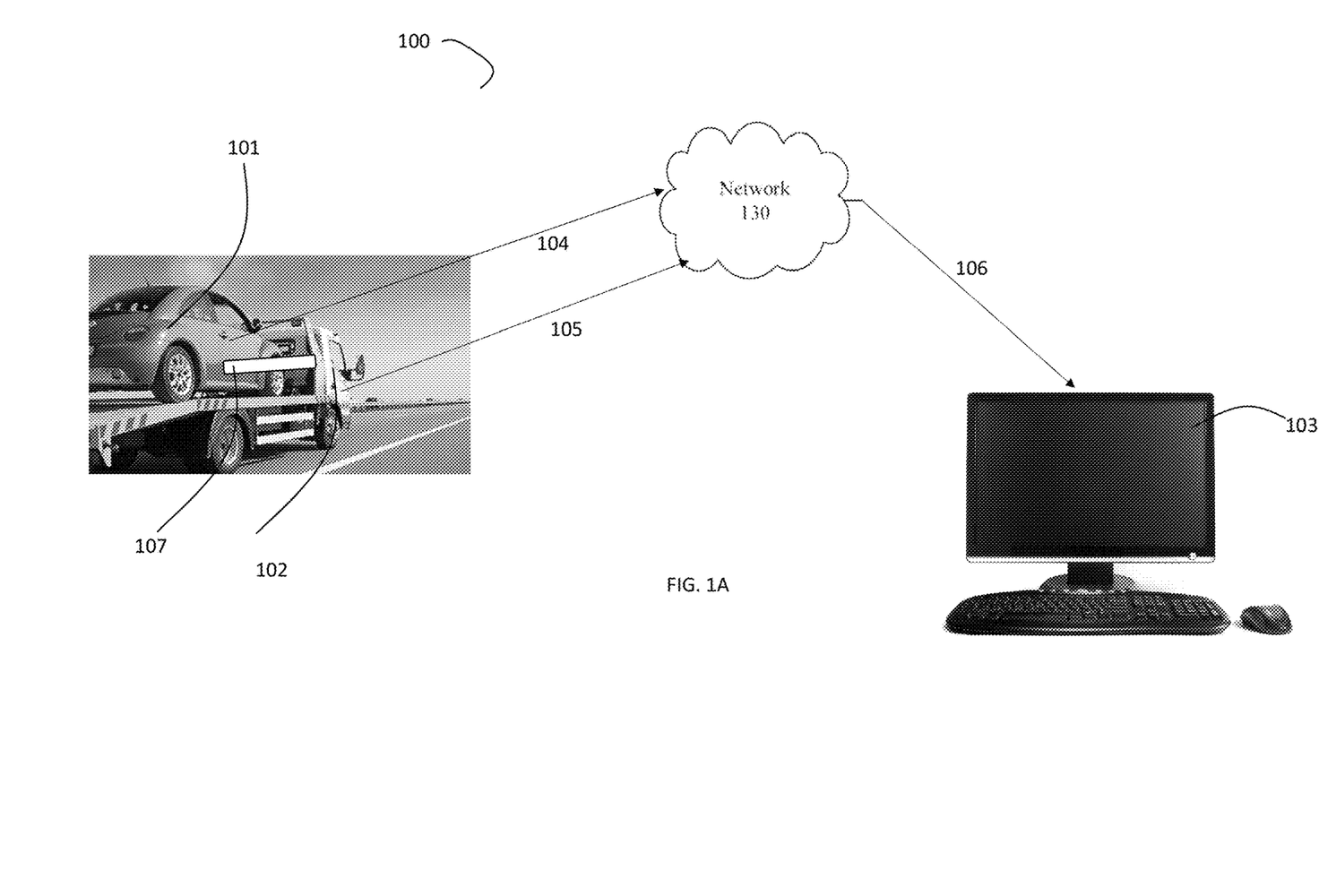
FIGS. 1A-1B are block diagrams of an environment for a vehicle placed on a transporter to be shipped or transported from one location to another, according to some embodiments.
Figure 1B:
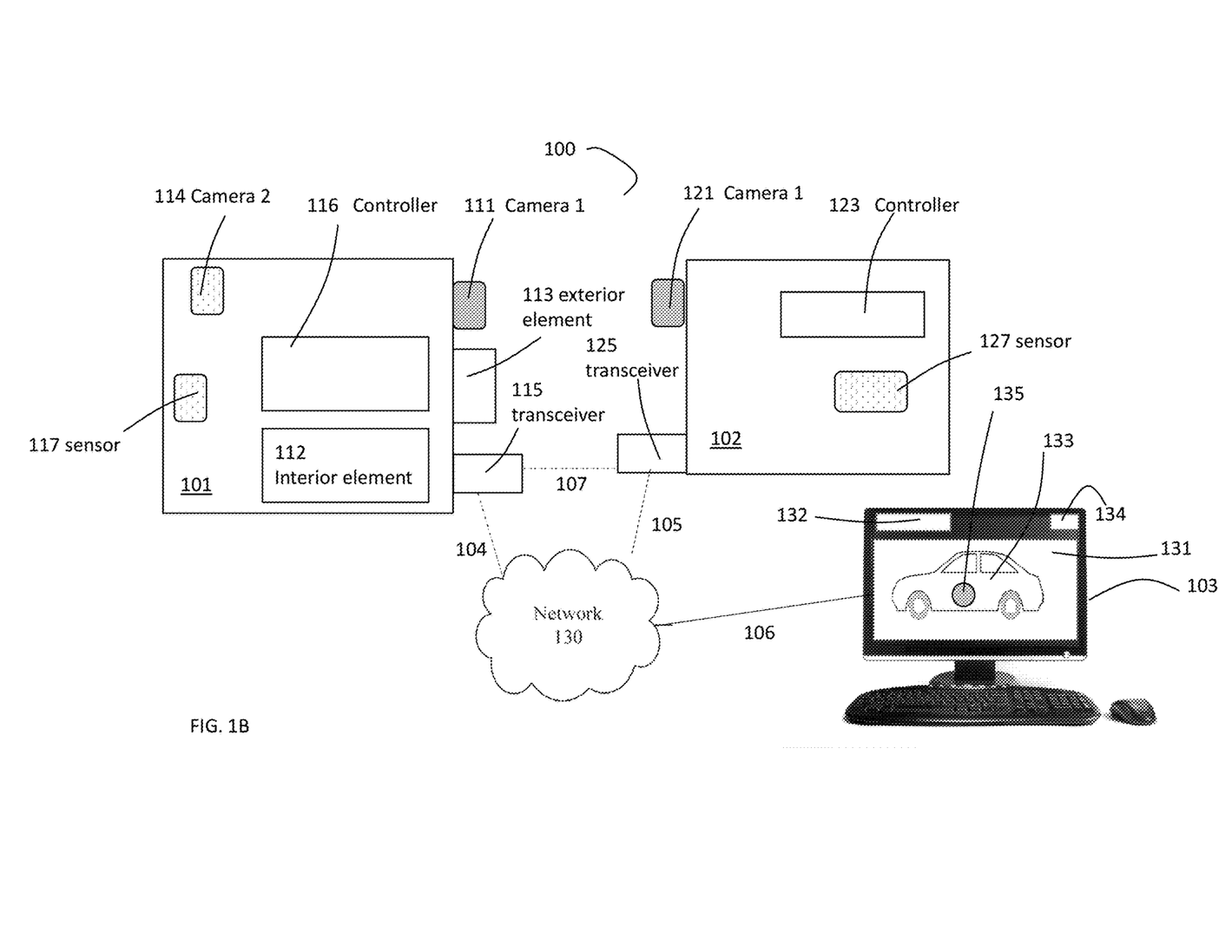

FIGS. 1A-1B are block diagrams of an environment 100 for a vehicle 101 placed on a transporter 102 to be transported, according to some embodiments. Vehicle 101 and transporter 102 may communicate with a core network 130, which may communicate with a computing device 103. It is to be understood that there may be more or fewer components included in environment 100, vehicle 101, transporter 102, core network 130, and computing device 103. Further, it is to be understood that one or more of the devices and components within environment 100, vehicle 101, transporter 102, core network 130, and computing device 103 may include additional and/or varying features from the description below, and may include any devices and components that one having ordinary skill in the art would consider and/or refer to as the devices and components of a vehicle, a transporter, a core network, and a computing device.

In embodiments, as shown in FIG. 1A, environment 100 includes vehicle 101 placed on transporter 102. Vehicle 101 may be a selected one of a commercial truck, a light duty car, a sport utility vehicle (SUV), a light vehicle, a heavy duty vehicle, a pickup truck, a van, a car, a motorcycle, or any other vehicle. Vehicle 101 can include various interior space, e.g., passenger space to transport humans, or cargo space to transport cargo. In some embodiments, there may not be a passenger within vehicle 101, and vehicle 101 may not be in an operative state. For example, the tires of vehicle 101 may not be in contact with the road surface. In some embodiments, vehicle 101 can be a computer assisted or autonomous driving (CA/AD) vehicle. When vehicle 101 is a CA/AD vehicle, the CA/AD functions of vehicle 101 may not be operational since vehicle 101 is not in an operative state. In some other embodiments, vehicle 101 can be a normal vehicle without some or all of CA/AD capability.

In some embodiments, vehicle 101 can be simply affixed to transporter 102 by some mechanical means, such as various couplers, e.g., a straight coupler, an a-frame coupler, or an adjustable coupler. In some other embodiments, vehicle 101 can be coupled to transporter 102 by additional electrical connections to communicate data or control, and to provide power. In some embodiments, transporter 102 can transport vehicle 101 on land. In some other embodiments, transporter 102 can transport vehicle 101 over water.

In embodiments, computing device 103 can be a wireless communication device, a smart phone, a laptop, a tablet, a personal assistant, a monitor, a wearable device, an Internet of Thing (IoT) device, a mobile station, a subscriber station, a remote terminal, a wireless terminal, or a user device. In some other examples, computing device 103 can be a desktop workstation, a server, and/or embedded system, communicatively coupled to core network 130 by wired lines, or any combination thereof. Computing device 103 can also be configured to operate based on a wide variety of wireless communication techniques. These techniques can include, but are not limited to, techniques based on 3rd Generation Partnership Project (3GPP) standards. In some embodiments, computing device 103 can be an independent computing device placed onboard vehicle 101 or transporter 102.

In some embodiments, vehicle 101 may communicate with transporter 102 via a communication link 107. Furthermore, vehicle 101 may communicate with core network 130 via a communication link 104. Vehicle 101 may communicate with transporter 102 or core network 130 without using built-in components or functions of vehicle 101. Instead, vehicle 101 can communicate with transporter 102 or core network 130 using added transceivers, cameras, or sensors, as shown in FIG. 1B. Transporter 102 may communicate with core network 130 via a communication link 105. In some embodiments, not all the communication links 104, 105, and 107 are present. For example, vehicle 101 may communicate with transporter 102 through link 107, while transporter 102 may communicate with core network 130 via communication link 105, without a communication link between vehicle 101 and core network 130. Furthermore, core network 130 may communicate with computing device 103 through a communication link 106.

In embodiments, communication links 104, 105, 106, and 107 may be a communication link in an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, a vehicle-to-vehicle (V2V) network, a vehicle-to-infrastructure (V2I) communication network, a vehicle-to-network (V2N) communication network, a vehicle-to-pedestrian (V2P) communication network, or a V2X communication network, or a combination of two or more such networks.

In addition, there may be other components not shown in FIG. 1A. For example, environment 100 can include various base stations, such as a node B, an enhanced or evolved node B (eNB), a next generation nodeB (gNB), a base transceiver station (BTS), an access point (AP), a roadside unit (RSU), or other communication components.

In embodiments, as shown in FIG. 1B, vehicle 101 can include various components such as one or more interior elements, one or more exterior elements, e.g., an interior element 112 and an exterior element 113. Vehicle 101 may include a camera 111, a camera 114, a transceiver 115, a controller 116, and a sensor 117. Many of the components shown in FIG. 1B for vehicle 101 can be optional.

In some embodiments, exterior element 113 may be selected from one or more of a part of a frame or a body of the vehicle, a wheel, a mirror, a door, a rim, a valance, a fender, or other exterior elements. Exterior element 113 is shown as one piece, but it may represent a plurality of exterior elements. Interior element 112 may include one or more of an engine, a fuel system, an electrical system, a cooling and lubrication system, an exhaust and emission control system, a drive train system, a suspension, a steering wheel, a brake system, an accessory and safety system, or other interior elements.

In some embodiments, camera 114 may be a part of vehicle 101 when vehicle 101 is manufactured. For example, camera 114 can be a part of the CA/AD system when vehicle 101 is a CA/AD vehicle. On the other hand, camera 111 can be an additional camera not included in vehicle 101 when vehicle 101 is manufactured. Instead, camera 111 can be installed on vehicle 101 for the purpose of monitoring vehicle 101 when vehicle 101 is being transported by transporter 102 from one location to another location. As such, camera 111 can be removed once vehicle 101 reaches its destination. Similarly, sensor 117 can be installed on vehicle 101 for the purpose of monitoring vehicle 101 when vehicle 101 is being transported by transporter 102, and can be removed once vehicle 101 reaches its destination. Sensor 117 is shown as a representative device of any information gathering device, such as a location sensor, a global positioning system (GPS) device, or any other device.

In some embodiments, controller 116 and transceiver 115 can be components not included in vehicle 101 when vehicle 101 is manufactured. Instead, controller 116 and transceiver 115 can be installed on vehicle 101 for the purpose of monitoring vehicle 101 when vehicle 101 is being transported by transporter 102, and can be removed once vehicle 101 reaches its destination. In some embodiments, transceiver 115 and controller 116 together can be a mobile device (e.g., cellular phone, tablet, etc.) tied to a driver or passenger seat and communicatively coupled to camera 111. Images taken by camera 111 can be received by the mobile device and transmitted to core network 130, which may be further transmitted to computing device 103.

In some embodiments, transporter 102 can include a camera 121, a controller 123, a transceiver 125, and a sensor 127. Camera 121, controller 123, transceiver 125, and sensor 127 can be integral to transporter 102 and are not necessarily tied to monitoring vehicle 101 for damage. In some other embodiments, camera 121, controller 123, transceiver 125, and sensor 127 can be installed on transporter 102 for the purpose of monitoring vehicle 101 when vehicle 101 is being transported by transporter 102. As such, camera 121, controller 123, transceiver 125, and sensor 127 can be removed once vehicle 101 reaches its destination.

In some embodiments, controller 123 or controller 116 can be an in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), electronic/engine control modules (ECMs), embedded systems, microcontrollers, control modules, or engine management systems (EMS).

In some embodiments, communication link 107 between transceiver 115 and transceiver 125 can be a wireless link based on a wireless technology selected from dedicated short range communications (DSRC) technology, Bluetooth technology, wireless fidelity (WiFi) technology, wireless local network (WLAN), cellular wireless network technology, wireless universal serial bus (WUSB) technology, short range radio technology, Near Field Communication (NFC) technology, and so forth. In some other embodiments, communication link 107 can be based on some other technology, such as a $I^2$ bus, an Integrated Drive Electronic (IDE) bus, a Serial Advanced Technology Attachment (SATA) bus, a Peripheral Component Interconnect (PCI) bus, a Universal Serial Bus (USB), and so forth.

In embodiments, computing device 103 can include a processor 132 and a storage device 134 coupled to processor 132. Processor 132 can include one or more central processing units (CPUs). In some embodiments, processor 132 can include a programmable device (such as a hardware accelerator or a FPGA). In embodiments, processor 132 may be a microcontroller, a 16-bit processor, a 32-bit processor, a 64-bit processor, a single core processor, a multi-core processor, a digital signal processor, an embedded processor, or any other processor.

In embodiments, storage device 134 can store a first image (not shown) taken at a first time instance, and a second image 133 taken at a second time instance after the first time instance, where the first image and the second image 133 are generated by one or more cameras, e.g., camera 121, camera 111, placed around vehicle 101. The first image and the second image 133 can cover a same portion of a body of vehicle 101. The second image 133 can be displayed on a GUI 131 of computing device 103. Processor 132 can detect a change 135 between a portion of the first image corresponding to the portion of the body of vehicle 101 and a portion of the second image 133 corresponding to the portion of the body of vehicle 101, where change 135 can be indicative of a collision. Processor 132 can further flag a potential damage to the portion of the body of vehicle 101 based on the detected change between the first image and the second image 133. In addition, based on data collected by sensor 117 or sensor 127, processor 132 can further determine locations and times when the first image and the second image 133 are taken, and identify the approximate position and time the damage has happened.

Figure 2:
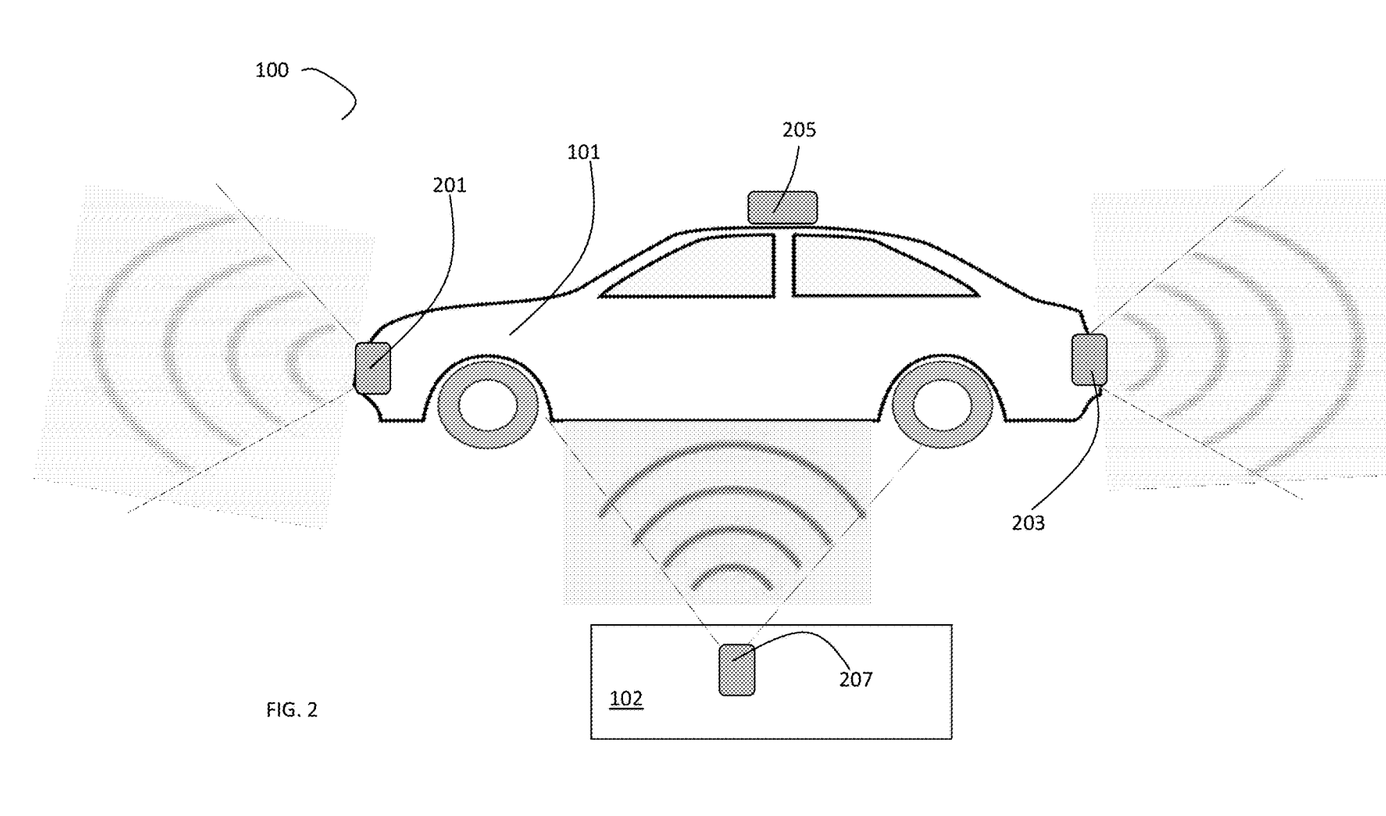
FIG. 2 illustrates a plurality of cameras placed around a vehicle to provide coverage around the vehicle, according to some embodiments.

FIG. 2 illustrates a plurality of cameras placed on or around vehicle 101 to provide coverage around the vehicle, according to some embodiments.

In some embodiments, vehicle 101 can include a camera 201, a camera 203, a camera 205, and a camera 207, placed on vehicle 101. Camera 207 can be placed on transporter 102 to provide coverage around vehicle 101. Camera 201 can be placed at the front of vehicle 101, and camera 203 can be placed at the end of vehicle 101. Additionally and alternatively, camera 201 can be placed on the front of vehicle 101 and camera 203 can be placed on the end of vehicle 101. Camera 205 can be placed on the top of or above vehicle 101 to have a bird's eye view of vehicle 101. In some embodiments, camera 201, camera 203, camera 205 can be in physical contact with vehicle 101 directly or indirectly through another object. In some other embodiments, camera 201, camera 203, camera 205 can be placed without physical contact with vehicle 101, but can capture a portion of a space around or surrounding vehicle 101. In some embodiments, camera 201, camera 203, camera 205, and camera 207 can be a time of flight camera or a night vision camera. Such cameras can use infrared or ultraviolet lights to determine what is in the area of view. Images taken by such cameras may not be accurate enough for an AC/CD car for rendering driving decisions, but they are useful for the purpose of detecting potential damages as described herein. Camera 201, camera 203, camera 205, or camera 207 are not a part of vehicle 101 when vehicle 101 is manufactured. Instead, they are placed on or around vehicle 101 for the purpose of monitoring vehicle 101 when vehicle 101 is in transit on transporter 102. Camera 201, camera 203, camera 205, and/or camera 207 can be affixed to vehicle 101 or transporter 102 by magnets or some other non-permanent adhesive.

Figure 3:
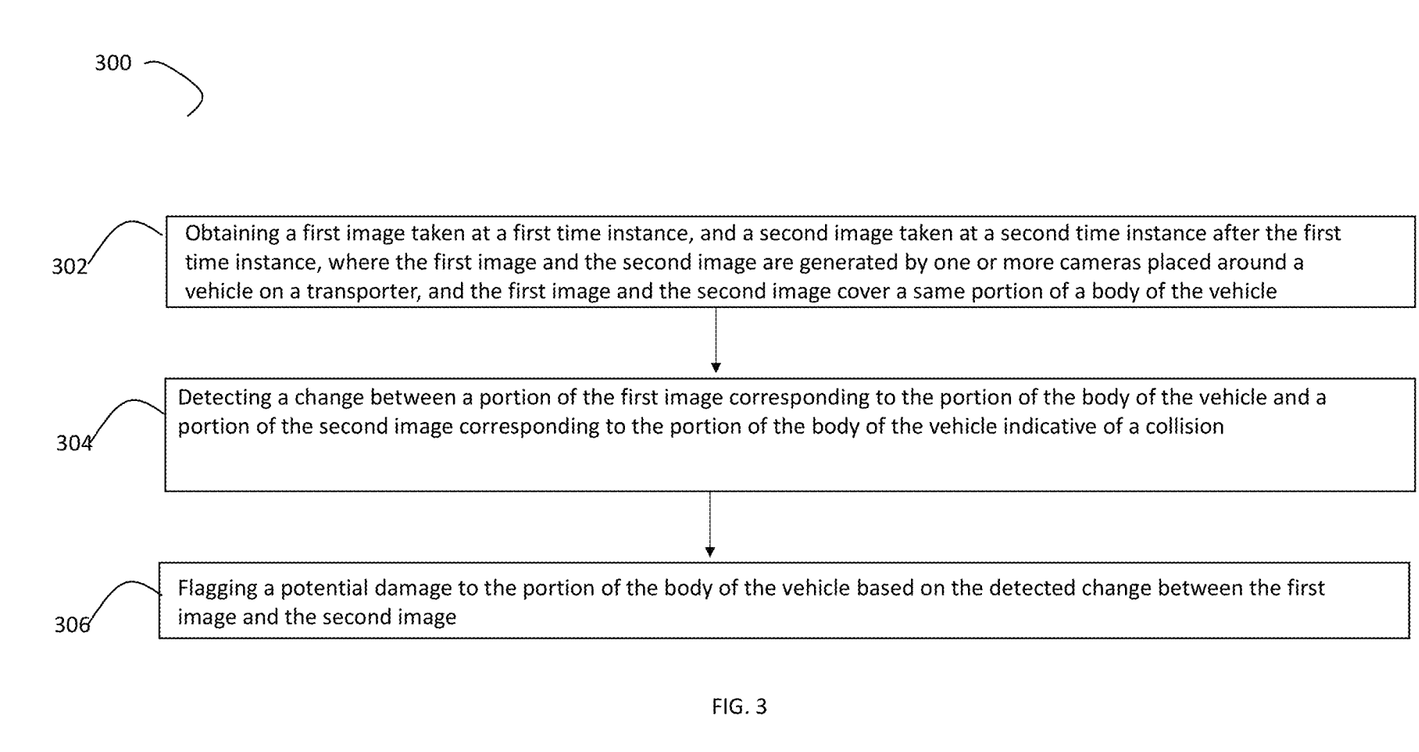
FIG. 3 illustrates an example method for detecting a potential damage caused to a vehicle when the vehicle is placed on a transporter to be shipped or transported from one location to another, according to some embodiments.
Figure 4:
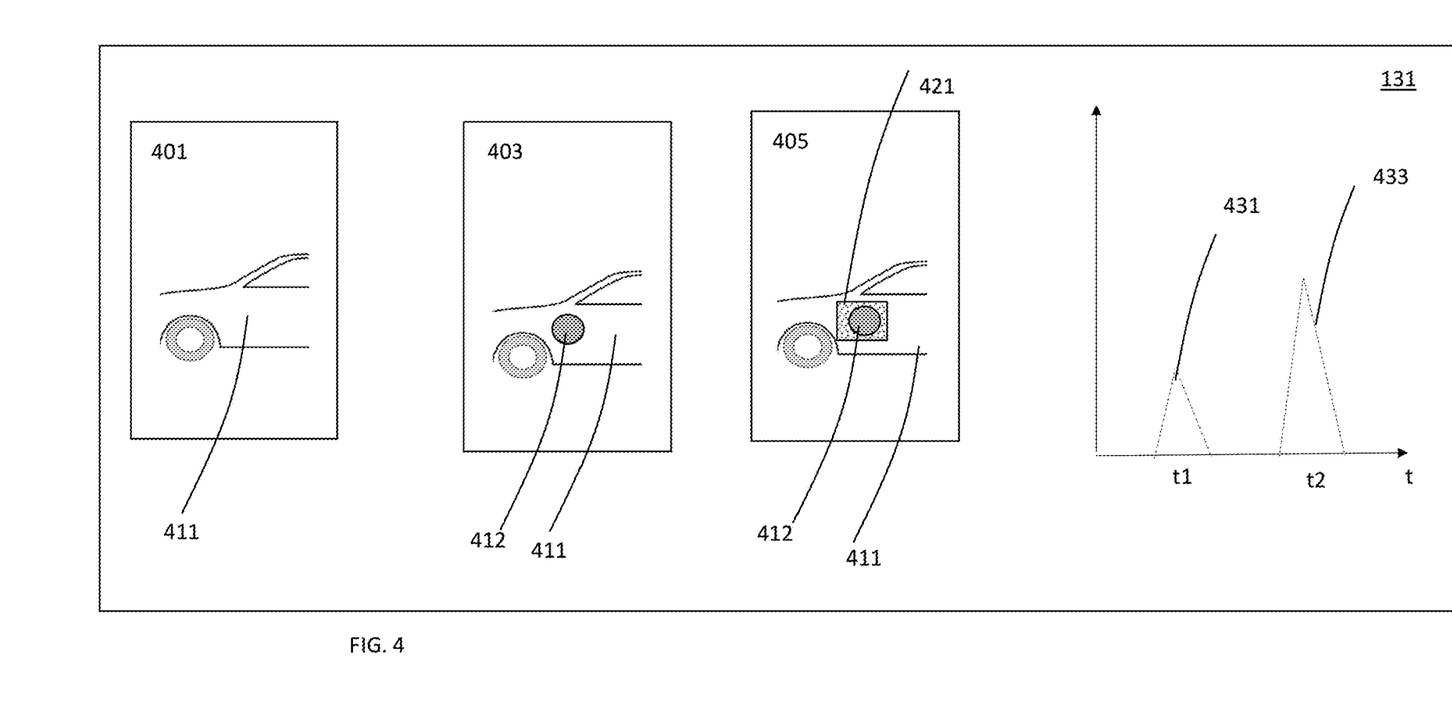
FIG. 4 illustrates multiple ways to show a first image and a second image taken by one or more cameras covering a same portion of a body of the vehicle, according to some embodiments.

FIG. 3 illustrates an example method 300 for detecting potential damage caused to a vehicle when the vehicle is placed on a transporter to be shipped or transported from one location to another, according to some embodiments. Method 300 can be performed by processor 132 of computing device 103 to detect a change between a portion of a first image corresponding to a portion of the body of the vehicle and a portion of a second image corresponding to the portion of the body of the vehicle indicative of a collision. FIG. 4 illustrates multiple ways to show a first image and a second image taken by one or more cameras covering a same portion of a body of vehicle 101, where the images can be displayed on GUI 131.

In 302, a first image is taken at a first time instance, and a second image is taken at a second time instance after the first time instance, where the first image and the second image are generated by one or more cameras placed around a vehicle on a transporter. For example, as shown in FIGS. 1B, 2, and 4, a first image 401 is taken at a first time instance by camera 205, and a second image 403 is taken at a second time instance by camera 205. The first image 401 and the second image 403 cover a same portion 411 of a body of vehicle 101. The second image 403 can be generated after the first image 401 has been generated. Furthermore, the first image 401 and the second image 403 are received from camera 205 at least partially by wireless communication through some of communication links 104, 105, 107, and 106. In some embodiments, the first image 401 or the second image 403 includes a heat map of the portion of the body of vehicle 101 generated by an infrared camera. The first image 401 and the second image 403 are a part of a sequence of images taken by camera 205. The time gap between the first image 401 and the second image 403 can be 1 minute, 2 minutes, 5 minutes, 10 minutes, or some other time interval. The time gap between the first image 401 and the second image 403 can be much larger than a time gap between images taken by cameras for CA/AD vehicles, which may be in microseconds or less. It can have more advantage to have the first image 401 and the second image 403 taken at a much slower speed compared to cameras for CA/AD vehicles. The first image 401 and the second image 403 are often not used for real time driving decision making. Therefore, there is no need to have them taken at a higher speed. In addition, the slower speed for taking the first image 401 and the second image 403 can reduce the amount of data being transmitted wirelessly to the computing device 103.

In 304, a change between a portion of the first image corresponding to the portion of the body of the vehicle and a portion of the second image corresponding to the portion of the body of the vehicle can be detected to be indicative of damage. For example, a change 412 can be detected by processor 132, where change 412 is between a portion of the first image 401 corresponding to the portion 411 of the body of vehicle 101 and a portion of the second image 403 corresponding to the portion 411 of the body of vehicle 101. The change 412 to the portion of the body of vehicle 101 is used an example. In some other embodiments, change 412 can happen to an internal component of the vehicle.

In some embodiments, various algorithms and mechanisms can be applied for detecting change 412 between the first image 401 and the second image 403. For example, change 412 can be detected by applying an outline of object recognition technique to the first image 401 and the second image 403. In detail, the outline of object recognition technique can include at least one of edge matching, divide-and-conquer search, greyscale matching, gradient matching, and/or histograms of receptive field response. Other algorithms for detecting changes between images can be applicable as well. Embodiments herein apply any change detection algorithms to detect changes of images taken for vehicles during the transmit process.

In 306, potential damage to the portion of the body of the vehicle can be flagged based on the detected change between the first image and the second image. For example, processor 132 can flag change 412 at GUI 131 as potential damage, which can be shown in different color or shape for change 412. In some embodiments, the potential damage to the portion of the body of the vehicle can include at least one of scratching, piercing, or dislocation of the portion of the body of the vehicle. To flag the change, in some examples, a date, time, and/or location of when the change occurred may be shown along with the change at GUI 131.

In some embodiments, in addition to flagging change 412, GUI 131 can further include a highlighted area 421 that includes change 412. The highlighted area 421 can indicate a generic area of concern. Pattern matching analysis of multiple images in the image collection can be performed to identify what may have damaged the car. If analysis of multiple images indicates that an item may have hit the car at a very high speed, a level of damage may be inferred and can be indicated in the highlighted area 421. The highlighted area 421 can indicate the potential damage, the damage type and severity, which can aid a human to make the final assessment as they're handling the car transaction. The highlighted area 421 can further provide information such as date and/or time, and one or more URLs to the images or videos. This is useful for when people are reviewing the car while in transit, or after the vehicle has been delivered, for the full context of what happened.

In some embodiments, other data can be used to further identify any potential damages. For example, if the first image 401 or the second image 403 shows an object that made contact with vehicle 101, but an accelerometer data does not show an increase of speed, it may be concluded that the incoming object may not have caused any damage to vehicle 101. In some other examples, further visual inspection of the potential damaged portion of vehicle 101 may be performed to verify whether the potential damage is real or not.

In some embodiments, GUI 131 can include a full 360 degree view of vehicle 101, together with any potential damage flagged. The full 360 degree view of vehicle 101 can be presented to suppliers and/or customers. Such data can be used in determining whether an insurance claim on the damage of the car is legitimately caused during the transit of vehicle 101. GUI 131 can further include other information, such as the date, time, and/or location to show when and where the potential damage occurred.

In some embodiments, GUI 131 can further present other useful information, such as a timeline view of multiple images. For example, GUI 131 can show a graph 431 at time t1 and a graph 433 at time t2. A user, such as a dealer, can then click into each of the graphs for a list of cars, and then click into the GUI of each car. For example, graph 431 represents a collection of multiple images of multiple cars. A point in graph 431 can represent an image of a car. By clicking in a point in graph 431, the corresponding image of the car will be displayed. Similar operations can be performed for graph 433. This is very helpful for those with multiple cars being monitored by the dealer.

Figure 5:
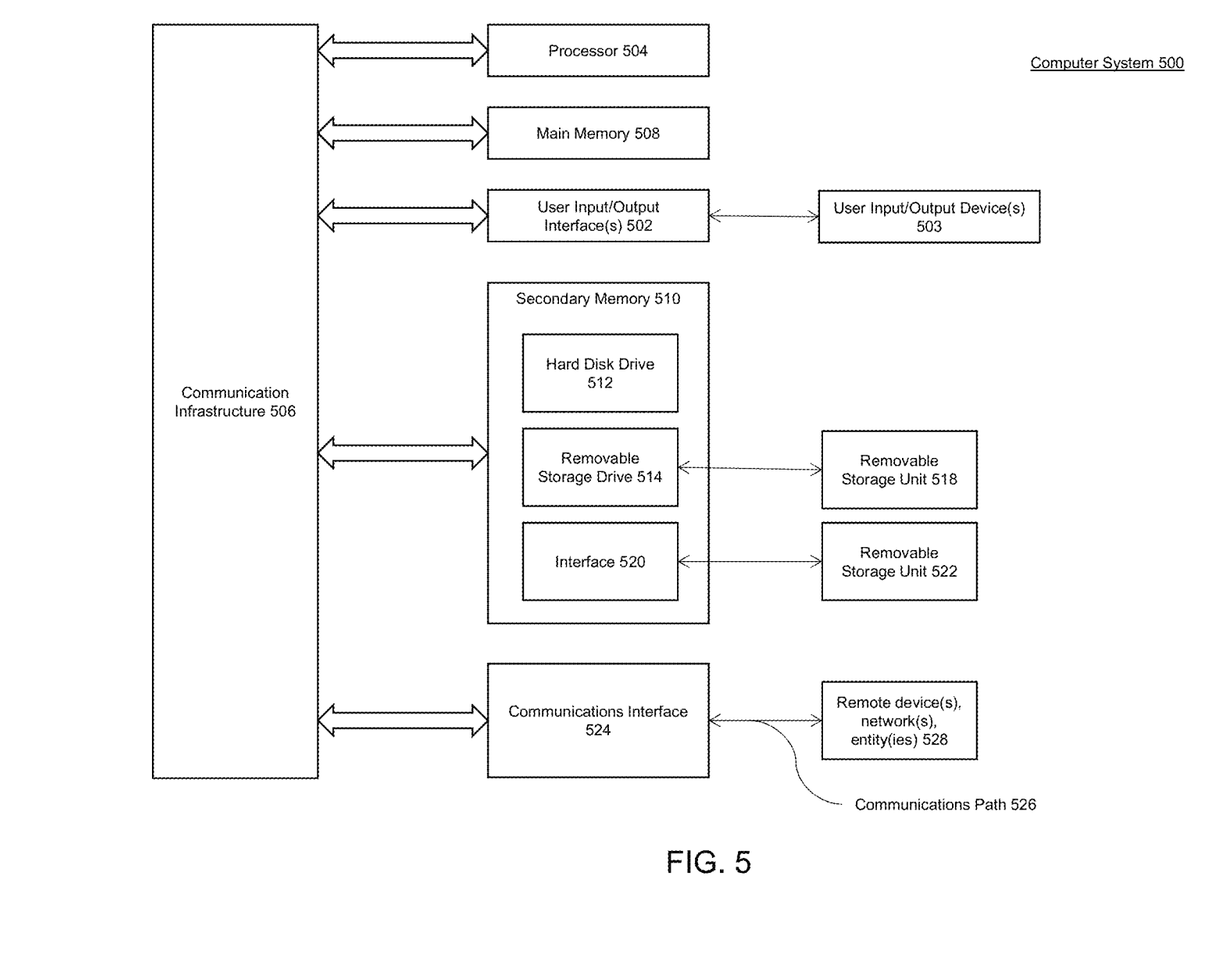
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. In some examples, computer system 500 can be used to implement computing device 103, controller 116, controller 123 as shown in FIG. 1B, or operations shown in FIG. 3.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein. For example, control logic may cause processor 504 to obtain a first image taken at a first time instance, and a second image taken at a second time instance after the first time instance, detect a change between a portion of the first image corresponding to the portion of the body of the vehicle and a portion of the second image corresponding to the portion of the body of the vehicle indicative of a collision, and flag a potential damage to the portion of the body of the vehicle based on the detected change between the first image and the second image. The first image and the second image are generated by one or more cameras placed around a vehicle on a transporter, and the first image and the second image cover a same portion of a body of the vehicle.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for determining a status of a vehicle, the method comprising:

obtaining, via a network, a first image taken at a first time instance, and a second image taken at a second time instance after the first time instance, wherein the first image and the second image are generated by one or more cameras placed proximate to a vehicle situated on a transporter, and wherein the first image and the second image cover a same portion of a body of the vehicle;

detecting, while the vehicle is in transit via the transporter, a change between a portion of the first image corresponding to the portion of the body of the vehicle and a portion of the second image corresponding to the portion of the body of the vehicle, wherein the change is indicative of a collision, wherein the detecting the change between the portion of the first image and the portion of the second image comprises applying an object recognition technique to the first image and the second image; and responsive to detecting the change between the portion of the first image and the portion of the second image, generating and causing a highlighted area to be displayed via a graphical user interface that displays the second image, wherein the highlighted area comprises an indication that identifies potential damage to the portion of the body of the vehicle, and wherein the highlighted area is displayed over the portion of the second image corresponding to the portion of the body of the vehicle in which the change was detected.

2. The computer-implemented method of claim 1, wherein the potential damage to the portion of the body of the vehicle comprises at least one of: scratching, piercing, or dislocation of the portion of the body of the vehicle.

3. The computer-implemented method of claim 1, wherein the first image and the second image are obtained from the one or more cameras at least partially by wireless communication.

4. The computer-implemented method of claim 1, wherein the object recognition technique comprises at least one of: edge matching, divide-and-conquer search, greyscale matching, gradient matching, or histograms of receptive field response.

5. The computer-implemented method of claim 1, wherein a plurality of cameras including the one or more cameras are placed on the transporter to provide coverage around the vehicle.

6. The computer-implemented method of claim 1, wherein at least one of the first image or the second image comprises a heat map of the portion of the body of the vehicle generated by an infrared camera.

7. The computer-implemented method of claim 1, wherein a camera of the one or more cameras is placed above the vehicle to provide a bird's eye view of the vehicle.

8. The computer-implemented method of claim 1, wherein the one or more cameras includes at least one of a time of flight camera or a night vision camera.

9. An apparatus for determining a status of a vehicle, the apparatus comprising:
a storage device configured to store a first image taken at a first time instance, and a second image taken at a second time instance after the first time instance, wherein the first image and the second image are generated by one or more cameras placed proximate to a vehicle on a transporter, and wherein the first image and the second image cover a same portion of a body of the vehicle; and
a processor communicatively coupled to the storage device, and configured to:
detect, while the vehicle is in transit via the transporter, a change between a portion of the first image corresponding to the portion of the body of the vehicle and a portion of the second image corresponding to the portion of the body of the vehicle, wherein the change is indicative of a collision, and wherein, to detect the change, the processor is configured to apply an object recognition technique to the first image and the second image; and
responsive to detection of the change between the portion of the first image and the portion of the second image, generate and cause a highlighted area to be displayed via a graphical user interface that displays the second image, wherein the highlighted area comprises an indication that identifies potential damage to the portion of the body of the vehicle, and wherein the highlighted area is displayed over the portion of the second image corresponding to the portion of the body of the vehicle in which the change was detected.

10. The apparatus of claim 9, wherein the potential damage to the portion of the body of the vehicle comprises at least one of: scratching, piercing, or dislocation of the portion of the body of the vehicle.

11. The apparatus of claim 9, wherein the first image and the second image are obtained from the one or more cameras at least partially by wireless communication.

12. The apparatus of claim 9, wherein the object recognition technique comprises at least one of: edge matching, divide-and-conquer search, greyscale matching, gradient matching, or histograms of receptive field response.

13. The apparatus of claim 9, wherein at least one of the first image or the second image comprises a heat map of the portion of the body of the vehicle generated by an infrared camera.

14. The apparatus of claim 9, wherein a camera of the one or more cameras is placed above the vehicle to provide a bird's eye view of the vehicle.

15. A non-transitory computer-readable medium storing instructions, the instructions, when executed by a processor, cause the processor to perform operations comprising:
obtaining a first image taken at a first time instance, and a second image taken at a second time instance after the first time instance, wherein the first image and the second image are generated by one or more cameras placed proximate to a vehicle situated on a transporter, and wherein the first image and the second image cover a same portion of a body of the vehicle;
detecting, while the vehicle is in transit via the transporter, a change between a portion of the first image corresponding to the portion of the body of the vehicle and a portion of the second image corresponding to the portion of the body of the vehicle, wherein the change is indicative of a collision, wherein the detecting the change between the portion of the first image and the portion of the second image comprises applying an object recognition technique to the first image and the second image; and
responsive to detecting the change between the portion of the first image and the portion of the second image, generating and causing a highlighted area to be displayed via a graphical user interface that displays the second image, wherein the highlighted area comprises an indication that identifies potential damage to the portion of the body of the vehicle, and wherein the highlighted area is displayed over the portion of the second image corresponding to the portion of the body of the vehicle in which the change was detected.

16. The non-transitory computer-readable medium of claim 15, wherein the potential damage to the portion of the body of the vehicle comprises scratching, piercing, or dislocation of the portion of the body of the vehicle.

17. The non-transitory computer-readable medium of claim 15, wherein the first image and the second image are obtained from the one or more cameras at least partially by wireless communication.

18. The computer-implemented method of claim 1, wherein the highlighted area further comprises an indication of a level of damage to the portion of the body of the vehicle.

19. The apparatus of claim 9, wherein the highlighted area further comprises an indication of a level of damage to the portion of the body of the vehicle.

20. The non-transitory computer-readable medium of claim 15, wherein the highlighted area further comprises an indication of a level of damage to the portion of the body of the vehicle.

* * * * *